United States Patent [19]
Brown et al.

[11] Patent Number: 5,152,241
[45] Date of Patent: Oct. 6, 1992

[54] CABLE STOPPER

[75] Inventors: Charles J. Brown, Harlow; Kenneth Taylor, Dunmow, both of United Kingdom

[73] Assignee: Northern Telecom Europe Limited, London, England

[21] Appl. No.: 678,063

[22] Filed: Apr. 1, 1991

[30] Foreign Application Priority Data

Apr. 4, 1990 [GB] United Kingdom ................. 9007595

[51] Int. Cl.⁵ .............................................. B63B 21/08
[52] U.S. Cl. ................................... 114/199; 24/115 R
[58] Field of Search ............ 114/199, 200; 24/115 R, 24/115 H, 115 K, 115 M, 132, 136 L, 268; 188/65.1-65.5

[56] References Cited

U.S. PATENT DOCUMENTS 4,166,427  9/1979  Bullard ................................. 114/199
4,428,100  1/1984  Apperson ........................... 24/115 R

FOREIGN PATENT DOCUMENTS

| 353517 | 5/1922 | Fed. Rep. of Germany ...... 114/199 |
| 197449 | 5/1923 | United Kingdom . |
| 257427 | 9/1926 | United Kingdom . |
| 671654 | 5/1952 | United Kingdom . |
| 688022 | 2/1953 | United Kingdom . |
| 1208898 | 10/1970 | United Kingdom . |
| 1249449 | 10/1971 | United Kingdom . |
| 1265338 | 3/1972 | United Kingdom . |
| 1367716 | 9/1974 | United Kingdom . |
| 1418490 | 12/1975 | United Kingdom . |
| 2169993 | 7/1986 | United Kingdom . |

Primary Examiner—Jesus D. Sotelo
Attorney, Agent, or Firm—Lee, Mann, Smith, McWilliams, Sweeney & Ohlson

[57] ABSTRACT

A split block cable stopper comprises several split blocks (FIG. 1) each defining a bore (3, 3A) whose diameter normal to the split is slightly less than the diameter of the cable being handled. The split blocks are pivotally mounted so that they can be moved away from the cable axis to enable a repeater or joint housing to pass freely through the cable stopper.

4 Claims, 3 Drawing Sheets

CABLE STOPPER

FIELD OF THE INVENTION

This invention relates to a cable stopper particularly but not exclusively for holding a submarine cable on board a ship during laying or recovery operations.

BACKGROUND OF THE INVENTION

During submarine cable laying or recovery operations, it is conventional practice to utilise a cable engine which pays out the cable or recovers the cable by gripping the cable between pairs of opposed tired wheels. Several pairs of such wheels are arranged to grip the cable one behind the other and are resiliently biased towards each other to grip the cable. When a repeater housing approaches, they can move apart to accommodate the larger diameter of the repeater housing.

During laying and recovery operations it is sometimes necessary to hold the cable while repairs or jointing to the cable are carried out and a cable stopper is used for this purpose.

Conventionally the cable stopper used comprises several helically-preformed wires which are snapped over the cable and the eye of the stopper is tied by a rope to a fixture on board the ship.

Whilst this known form of cable stopper is successful for short periods, over longer periods it can cause damage to the cable and this could well be the case if for example laying or recovery operations had to be halted during a spell of bad weather.

Furthermore we have found that when laying or recovering cable from extreme depths, damage to the cable can readily occur with this known form of stopper.

It is an object of the present invention to devise an alternative stopper which is convenient to use yet does not cause damage to the cable even at high tensile loads, e.g. greater than 5 tons.

According to the present invention there is provided a cable stopper for use in conjunction with a cable engine which can move the cable in an axial direction, the stopper comprising a plurality of cable clamping elements at spaced locations along the cable axis, each element comprising a pair of cooperating parts having surface grooves dimensioned to form a hole when the parts are urged together, the hole being slightly less in diameter than the cable diameter whereby in use to squeeze the cable and clamp it, wherein the two parts of each said clamping element are mounted on respective supports which can be moved towards and away from the position normally occupied by the cable so as to allow introduction of a cable to the elements and/or to enable passage of a repeater or joint housing past the stopper, and wherein said elements are immovable relative to one another in the direction of the cable axis.

Preferably each block part is mounted for pivotal movement towards and away from a clamping position around the cable to be clamped whereby to make room for the passage of a repeater or joint housing.

Preferably the grooves are provided in respective clamping surfaces each formed in a plastics material supported by a metal backplate.

According to another aspect of the present invention, there is provided a method of temporarily holding a cable on board a ship during laying or recovery operations, comprising applying around the cable at several discrete locations, respective clamping parts, each part having a cooperating groove designed to fit the diameter of the cable such that the diameter of the hole produced by the cooperating grooves is slightly smaller at least in one direction than the diameter of the cable, and applying pressure to the applied parts to thereby clamp the cable at the plurality of locations along the length of the cable.

BRIEF DESCRIPTION OF THE DRAWINGS

In order that the invention can be clearly understood reference will now be made to the accompanying drawings in which.

DESCRIPTION OF PREFERRED EMBODIMENT

Figure 1:
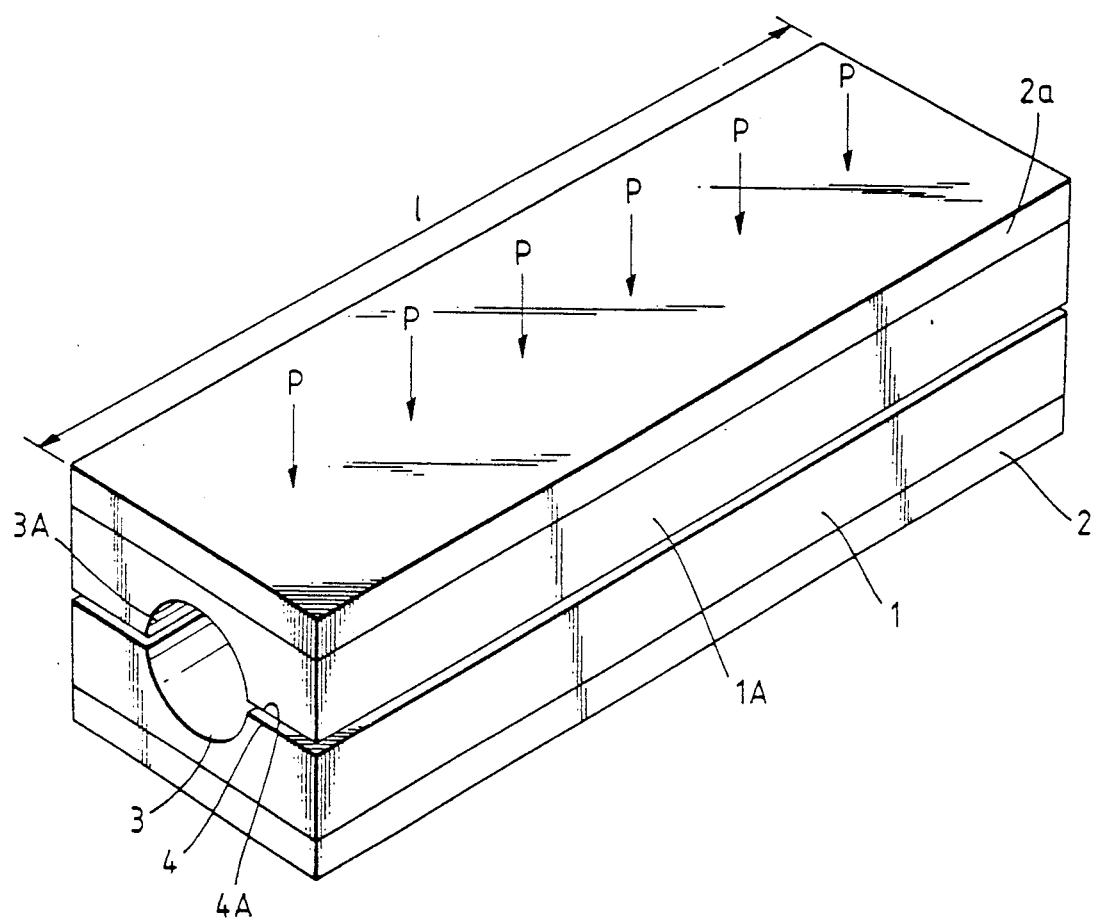
FIG. 1 shows a perspective and somewhat schematically a split block cable stopper element of a cable stopper according to an embodiment of the invention.

Referring to FIG. 1 of the drawings there is shown an element of a split block cable stopper according to an embodiment of the invention. The element comprises a split block, each half comprising a plastics or metal/plastics lined face plate 1 having a steel reinforcing backplate 2 secured to the faceplate 1.

Each faceplate has a semicircular groove 3 dimensioned to suit the sheath of the submarine cable being handled.

Reference numbers 1A, 2A and 3A identify similar parts of the opposing half of the split block.

The diameter of the hole formed when the two blocks are positioned together is slightly less than the diameter of the cable being handled and this is achieved by forming the hole the same size as the sheath of the cable being handled, and then skimming a thin layer from the facing surfaces 4 and 4A of the faceplates. This ensures that the diameter of the hole sideways is the same as the diameter of the cable sheath whereas the diameter of the hole normal to the faces 4 and 4A is slightly less than the diameter of the cable sheath. This ensures that the cable sheath does not get "nipped" or damaged when the two halves of the split block are drawn together around the cable, yet becomes tightly clamped in the grooves when the force P is applied as shown, preferably by means of an hydraulic activating device.

The length 1 of the split block is typically 15 cm and each split block is designed to provide 7.5 kN coupling to the cable.

Figure 2:
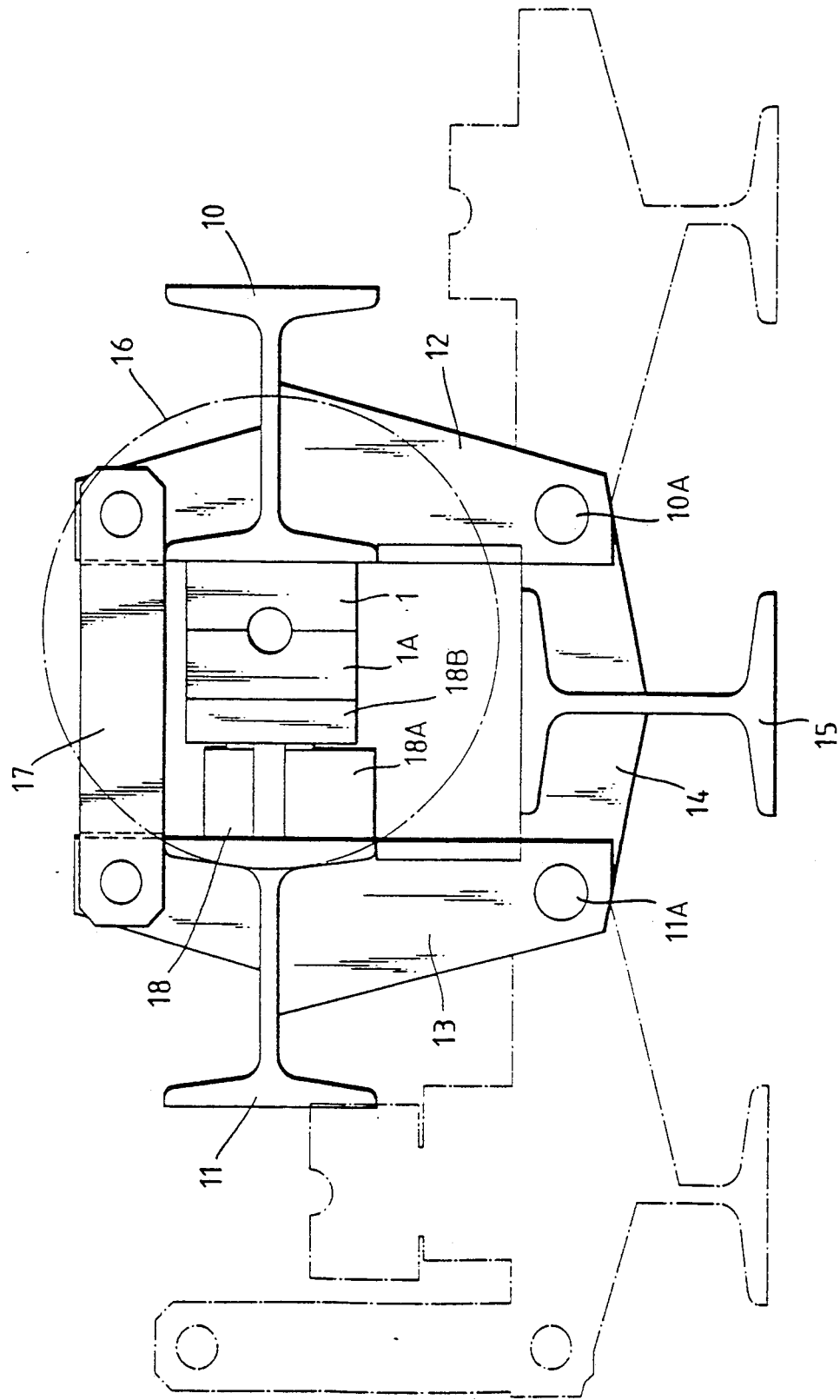
FIG. 2 shows a front view of the split block cable stopper according to the embodiment of the invention.
Figure 3:
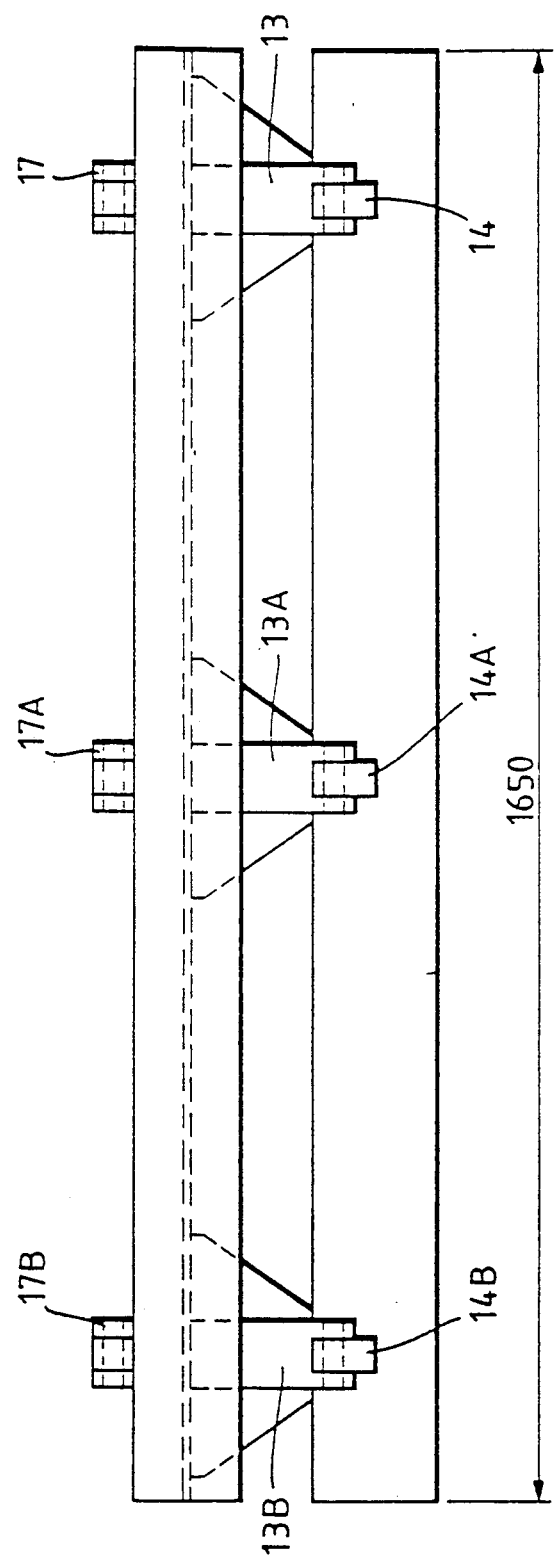
FIG. 3 shows a side view of the stopper.

Referring to FIGS. 2 and 3 of the drawing, there are ten split blocks each half being mounted on respective supporting beams 10 and 11. Each beam 10 and 11 has three arms 12 on the right hand side, only one of which can be seen in FIG. 2, and three arms 13, 13A and 13B on the left hand side as viewed in FIG. 3, only one of the left hand arms (13) can be seen in FIG. 2.

Each of the arms such as 12 and 13 is mounted on a respective cross beam 14, 14A and 14B, in turn secured to a base beam 15 secured to the deck of the ship. Only 14 is visible in FIG. 2.

As shown in broken lines the arms such as 12 and 13 can pivot about pivots 10A and 11A away from the closed clamping position shown in full lines to an open position shown in broken line to provide space for a repeater shown in broken line and indicated by the reference numeral 16.

When the block halves are assembled in their clamping position the two beams 10 and 11 are latched together by means of three latch members 17, 17A and 17B.

To clamp the cable the left-hand half of the split block 1A is mounted on a hydraulic actuating device indicated by the reference numeral 18 in FIG. 2 and there would be one such device for each split block. When the cylinder 18A is hydraulically actuated the piston 18B within the cylinder presses the block half 1A towards the block half 1 to clamp the cable.

The overall length of the assembly shown in FIGS. 2 and 3 is approximately 1 meter and this device is able to hold a tensile load in the cable in the region 6-10 tons. It is specifically intended for use with a "lightweight" cable, that is to say unarmoured so that the blocks will clamp directly onto the dielectric material which insulates the central conductor of the cable which conducts power to the repeaters, from the sea water. A typical range of cable diameter is 40 mms to 10 mms.

Alternatively the cable may be part of an unrepeatered system in which case the sheath is not necessarily acting as a dielectric for power supply purposes.

A typical cable suitable for use in this split block stopper is described in our patent specification No. GB 2176905.

If higher tensile loads are required then more split blocks can be added to the cable stopper.

Our tests have shown that each split block of the stopper gives a clamping force equivalent to 3 wheel pairs of a linear cable engine and each split block provides a coupling force of 7.5 kN on the cable.

The gaps between adjacent split blocks can be used to monitor cable movement/creep etc.

We have found that the stopper described provides improved internal cable coupling between the elements of the cable and little or no surface damage to the cable results. The cable clamping size can be arranged to suit individual cable diameters and higher tensile loads can be held simply by increasing the length of the split block cable stopper.

It is envisaged that this stopper will be aligned axially with the longitudinal axis of the pairs of wheels of the linear cable engine so that the stopper can be immediately applied at any time during laying or recovery of the cable through the linear cable engine.

Although hydraulic activation is described it would be possible to use a strong spring action on a lever to provide a mechanical advantage in forcing the block parts together by the magnified force of the spring.

Although the stopper element comprise two parts (halves), there could be more than two parts, e.g. three parts cooperating, each providing a portion e.g. ⅓ of the hole surface.

We claim:

1. A cable stopper for use in conjunction with a cable engine which can move the cable in an axial direction, the stopper comprising a plurality of cable clamping elements disposed at spaced locations along the cable axis, each element comprising a pair of cooperating parts having surface grooves of semicircular cross section and dimensioned to form a hole when the parts are urged together in a direction perpendicular to the cable axis, the hole being slightly less in diameter than the cable diameter whereby in use to squeeze the cable and clamp it between the pair of co-operating parts, wherein the two co-operating parts of each said clamping element are mounted on respective supports provided with means for urging the co-operating parts together, which supports can be moved towards and away from the position normally occupied by the cable so as to allow introduction of a cable to the elements and to enable passage of a repeater or joint housing past the stopper, and wherein said clamping elements are immovable relative to one another in the direction of the cable axis.

2. A stopper as claimed in claim 1 wherein each said part comprises a grooved plastics faceplate mounted on a reinforcing metal backplate.

3. A cable stopper for use in conjunction with a cable engine which can move the cable in an axial direction, the stopper comprising a plurality of cable clamping elements disposed at spaced locations along the cable axis, each element comprising a pair of co-operating parts having surface grooves of semicircular cross section and dimensioned to form a hole when the parts are urged together in a direction perpendicular to the cable axis, the hole being slightly less in diameter than the cable diameter whereby in use to squeeze the cable and clamp it between the pair of co-operating parts, and a hydraulic press whereby in use the pairs of co-operating parts may be urged together to clamp the cable, wherein the co-operating parts of each said clamping element are mounted on respective supports which can be moved towards and away from the position normally occupied by the cable so as to allow introduction of a cable to the elements and to enable passage of a repeater or joint housing part of the stopper, and wherein said clamping elements are immovable relative to one another in the direction of the cable axis.

4. A stopper as claimed in claim 3, comprising a longitudinal beam for mounting the stopper, cross arms secured to the beam, and a pair of parallel beams carrying respective parts of the plurality of clamping elements, which pair of beams are respectively pivotally mounted to the cross arms for movement towards and away from the clamping position around the cable being handled.

* * * * *